US008825681B2

(12) United States Patent
Gruen

(10) Patent No.: US 8,825,681 B2
(45) Date of Patent: Sep. 2, 2014

(54) METHOD, SYSTEM AND PROGRAM PRODUCT FOR TRANSMITTING ELECTRONIC COMMUNICATIONS USING AUTOMATICALLY FORMED CONTACT GROUPS

(75) Inventor: Daniel M. Gruen, Newton, MA (US)

(73) Assignee: International Business Machines Corporation, Armonk, NY (US)

( * ) Notice: Subject to any disclaimer, the term of this patent is extended or adjusted under 35 U.S.C. 154(b) by 1812 days.

(21) Appl. No.: 10/323,106

(22) Filed: Dec. 18, 2002

(65) Prior Publication Data
US 2004/0122838 A1 Jun. 24, 2004

(51) Int. Cl.
G06F 7/00 (2006.01)

(52) U.S. Cl.
USPC .......................................... 707/758; 707/782

(58) Field of Classification Search
USPC ................... 707/1–104.1, 758, 782
See application file for complete search history.

(56) References Cited

U.S. PATENT DOCUMENTS

| | | | | |
|---|---|---|---|---|
| 5,870,744 A * | 2/1999 | Sprague | | 707/9 |
| 5,884,282 A | 3/1999 | Robinson | | 705/27 |
| 5,892,909 A | 4/1999 | Grasso et al. | | 709/201 |
| 5,903,723 A * | 5/1999 | Beck et al. | | 709/200 |
| 5,913,032 A * | 6/1999 | Schwartz et al. | | 709/213 |
| 5,950,193 A * | 9/1999 | Kulkarni | | 707/3 |
| 5,990,886 A | 11/1999 | Serdy et al. | | 745/752 |
| 5,999,932 A * | 12/1999 | Paul | | 707/10 |
| 6,073,138 A | 6/2000 | de l'Etraz et al. | | 707/106.1 |
| 6,092,049 A | 7/2000 | Chislenko et al. | | 705/10 |
| 6,137,911 A | 10/2000 | Zhilyaev | | 382/225 |
| 6,189,026 B1 * | 2/2001 | Birrell et al. | | 709/206 |
| 6,205,472 B1 * | 3/2001 | Gilmour | | 709/206 |
| 6,247,043 B1 * | 6/2001 | Bates et al. | | 709/200 |
| 6,324,541 B1 | 11/2001 | de l'Etraz et al. | | 707/104.1 |
| 6,366,913 B1 | 4/2002 | Fitler, Jr. et al. | | 707/9 |
| 6,816,274 B1 * | 11/2004 | Silverbrook et al. | | 358/1.15 |
| 6,957,229 B1 * | 10/2005 | Dyor | | 707/103 X |
| 7,009,738 B2 * | 3/2006 | Silverbrook et al. | | 358/402 |
| 7,133,869 B2 * | 11/2006 | Bryan et al. | | 707/9 |
| 7,165,041 B1 * | 1/2007 | Guheen et al. | | 705/26 |
| 7,539,747 B2 * | 5/2009 | Lucovsky et al. | | 709/224 |
| 2001/0002469 A1 * | 5/2001 | Bates et al. | | 707/1 |
| 2001/0056463 A1 * | 12/2001 | Grady et al. | | 709/203 |
| 2002/0002526 A1 | 1/2002 | Kotas | | 705/37 |
| 2002/0016744 A1 * | 2/2002 | Mitsuoka et al. | | 705/26 |
| 2002/0057284 A1 * | 5/2002 | Dalby et al. | | 345/700 |
| 2002/0087534 A1 * | 7/2002 | Blackman et al. | | 707/4 |
| 2002/0120462 A1 * | 8/2002 | Good | | 705/1 |
| 2002/0138582 A1 * | 9/2002 | Chandra et al. | | 709/206 |

(Continued)

OTHER PUBLICATIONS

Lewis et al., "Disambiguation of Intended E-Mail Recipients by Contextual Analysis of E-Mail Subject and Body Text", RD n450, Oct. 2001, Article 111, p. 1749.

Primary Examiner — James Trujillo
Assistant Examiner — Linh Black
(74) Attorney, Agent, or Firm — Ed Choi; Hoffman Warnick LLC

(57) ABSTRACT

Under the present invention, one or more groups of contacts are implicitly formed based on a history of electronic communications that involve the contacts. When one or more contacts in a particular group is identified as an intended recipient of a (current) electronic communication, the entire group will be identified to the sender. If the sender then selects group, the contacts therein will be made additional recipients of the current electronic communication.

25 Claims, 4 Drawing Sheets

(56) References Cited

U.S. PATENT DOCUMENTS

| | | |
|---|---|---|
| 2002/0143871 A1* | 10/2002 | Meyer et al. ................ 709/204 |
| 2002/0151992 A1* | 10/2002 | Hoffberg et al. ............. 700/83 |
| 2002/0188688 A1* | 12/2002 | Bice et al. .................. 709/206 |
| 2003/0023435 A1* | 1/2003 | Josephson .................. 704/235 |
| 2003/0058858 A1* | 3/2003 | Berlyoung et al. ......... 370/390 |
| 2003/0090737 A1* | 5/2003 | Silverbrook et al. ........ 358/402 |
| 2003/0150910 A1* | 8/2003 | Lapstun et al. ............. 235/380 |
| 2003/0233418 A1* | 12/2003 | Goldman .................... 709/206 |
| 2004/0002932 A1* | 1/2004 | Horvitz et al. .............. 706/46 |
| 2004/0003392 A1* | 1/2004 | Trajkovic et al. ........... 725/10 |
| 2004/0044536 A1* | 3/2004 | Fitzpatrick et al. .......... 705/1 |
| 2004/0203977 A1* | 10/2004 | Kennedy ..................... 455/518 |

\* cited by examiner

METHOD, SYSTEM AND PROGRAM PRODUCT FOR TRANSMITTING ELECTRONIC COMMUNICATIONS USING AUTOMATICALLY FORMED CONTACT GROUPS

BACKGROUND OF THE INVENTION

1. Field of the Invention

The present invention generally relates to a method, system and program product for transmitting electronic communications using implicitly formed contact groups. Specifically, the present invention allows a group of contacts to be formed based on a history of electronic communications that involve the contacts.

2. Background Art

As the use of electronic communication grows, individuals are increasingly seeking more efficiently ways to identify electronic communication contacts. For example, electronic mail has become extremely popular for both personal and professional communications. In many cases, multiple users are party to a single electronic message. Unfortunately, when addressing a message to multiple users, the sender must often remember the names and/or addresses of each intended recipient. One common technique used in avoiding such hassles is to locate a previous message sent between the same users and then select "reply to all." However, locating such a message is not always easy. Specifically, the sender could have many previous messages saved in his/her mailbox. The messages could be saved in any order (e.g., chronological, alphabetically, etc.) Unless the sender knows when the previous message was received, or the name of the first "recipient" thereof, the sender can spend a significant amount of time locating an appropriate previous message. Moreover, once located, the sender may have to edit the listed recipients so that only appropriate recipients will receive the current message. The sender may also have to edit the subject line to fit the purpose of the current message.

One previous attempt to address these problems involves manual formation of user/contact groups. Specifically, a sender can set up one or more groups of users. When the sender wishes to send a message to all users in the group, the sender need only select the group, and not individual users. This, however, requires deliberate efforts on the part of the sender to establish and update each user group. It also requires the sender to remember the various names of each user group he/she has established. This can be especially tedious where the sender has established a large quantity of groups.

Therefore, there exists a need for a method, system and program product for transmitting an electronic message using an implicitly formed contact group. Specifically, a need exists for a group of contacts to be implicitly/automatically formed based on a history of electronic communications that involve the contacts. A further need exists for a group of contacts to be identified to a sender of an electronic message when the sender identifies one of the contacts as an intended recipient of a current electronic communication. Still yet, a need exists for the contacts in the group to be added as additional recipients to the electronic communication when the group is selected by the sender.

SUMMARY OF THE INVENTION

In general, the present invention provides a method, system and program product for transmitting electronic communications using implicitly/automatically formed contact groups. Specifically, under the present invention, one or more groups of contacts are implicitly formed based on a history of electronic communications that involve the contacts. When one or more contacts in a particular group are identified as an intended recipient of a (current) electronic communication, the entire group will be identified to the sender. If the sender then selects the group, the contacts therein will be made additional recipients of the current communication.

According to a first aspect of the present invention, a method for transmitting electronic communications using implicitly formed contact groups is provided. The method comprises: (1) identifying a set of recipients for a current electronic communication; (2) providing at least one group of contacts that includes the identified set of recipients, wherein the at least one group of contacts is implicitly formed based on a history of electronic communications that involve the contacts; and (3) selecting the group to add the contacts to the set of recipients of the current electronic communication.

According to a second aspect of the present invention, a method for implicitly forming a group of contacts based on a history of electronic communications that involve the contacts is provided. The method comprises: (1) examining the history of electronic communications between the contacts for a pattern that defines the group of contacts; and (2) forming the group of contacts if the pattern meets a predefined standard.

According to a third aspect of the present invention, a system for transmitting electronic communications using implicitly formed contact groups is provided. The system comprises: (1) a grouping system for implicitly forming a group of contacts based on a history of electronic communications that involve the contacts; (2) a reference system for identifying the group when one of the contacts is identified as an intended recipient of a current electronic communication; and (3) a selection system for selecting the group, wherein upon selection of the group, the contacts are made additional recipients of the current electronic message.

According to a fourth aspect of the present invention, a program product stored on a recordable medium for transmitting electronic communications using implicitly formed contact groups is provided. When executed, the program product comprises: (1) program code for implicitly forming a group of contacts based on a history of electronic communications that involve the contacts; (2) program code for identifying the group when one of the contacts is identified as an intended recipient of a current electronic communication; and (3) program code for selecting the group, wherein upon selection of the group, the contacts are made additional recipients of the current electronic message.

Therefore, the present invention provides a method, system and program product for transmitting electronic communications using implicitly/automatically formed contact groups.

BRIEF DESCRIPTION OF THE DRAWINGS

These and other features of this invention will be more readily understood from the following detailed description of the various aspects of the invention taken in conjunction with the accompanying drawings in which.

Figure 1:
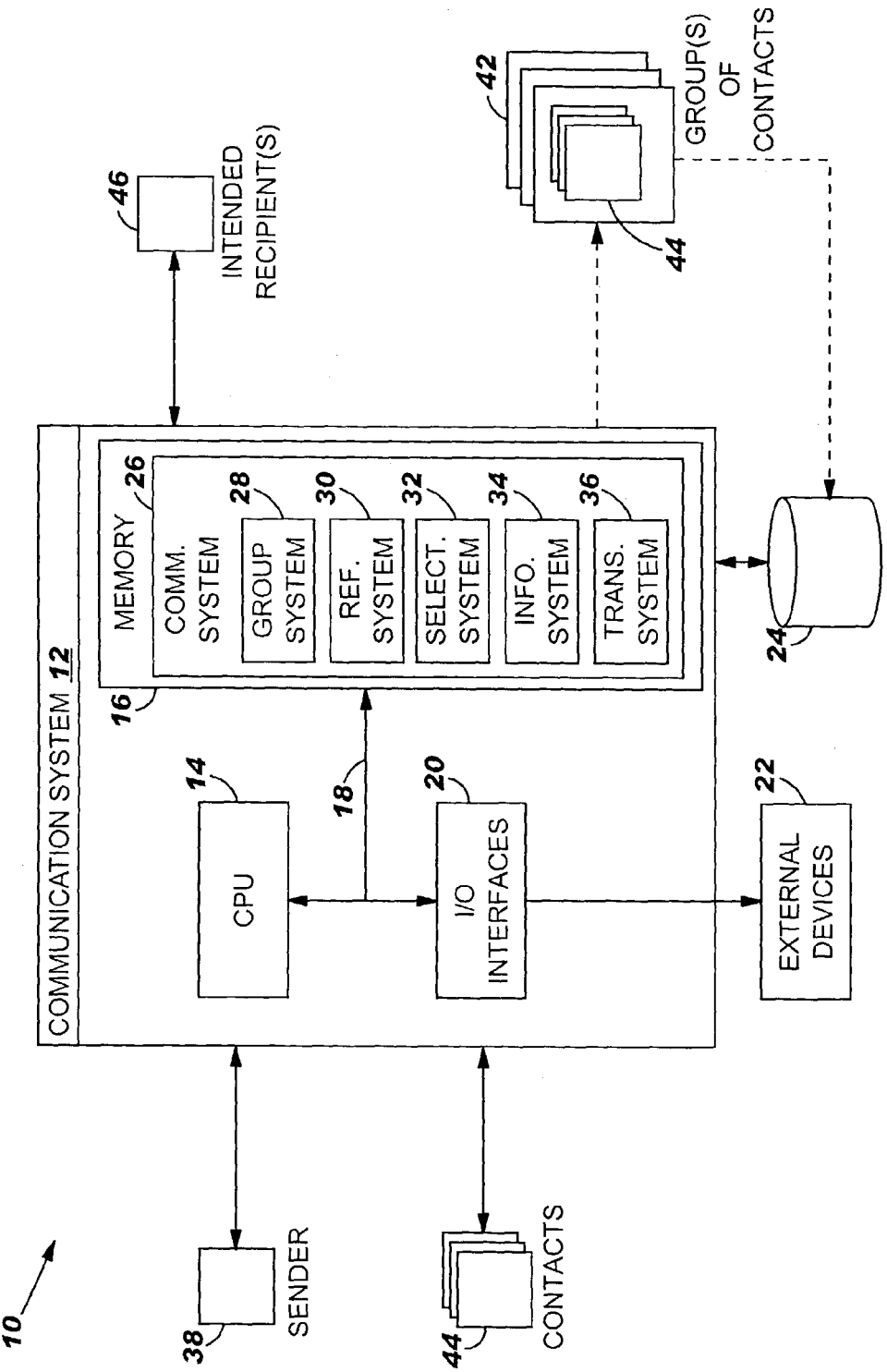
FIG. 1 depicts a system for transmitting electronic messages using implicitly formed contact groups, according to the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As indicated above the present invention provides a method, system and program product for transmitting electronic communications using implicitly/automatically formed contact groups. Specifically, under the present invention, one or more groups of contacts are implicitly formed based on a history of electronic communications that involve the contacts. When one or more contacts in a particular group are identified as an intended recipient of a (current) electronic communication, the entire group will be identified to the sender. If the sender then selects the group, the contacts therein will be made additional recipients of the current communication. It should be understood in advance that the teachings of the present invention can be used in conjunction with any type of electronic communication. Examples include, among others, electronic mail messages, instant messages, short messages, meeting invitations, etc.

Referring now to FIG. 1, system 10 for transmitting electronic communications using implicitly formed contact groups is shown. As depicted, system 10 includes computer system 12, which is intended to represent any type of computerized system that facilitates the transmission of electronic communications. For example, computer system 12 can be an electronic mail server or the like. As depicted, computer system 12 generally comprises central processing unit (CPU) 14, memory 16, bus 18, input/output (I/O) interfaces 20, external devices/resources 22 and database 24. CPU 14 may comprise a single processing unit, or be distributed across one or more processing units in one or more locations, e.g., on a client and server. Memory 16 may comprise any known type of data storage and/or transmission media, including magnetic media, optical media, random access memory (RAM), read-only memory (ROM), a data cache, a data object, etc. Moreover, similar to CPU 14, memory 16 may reside at a single physical location, comprising one or more types of data storage, or be distributed across a plurality of physical systems in various forms.

I/O interfaces 20 may comprise any system for exchanging information to/from an external source. External devices/resources 22 may comprise any known type of external device, including speakers, a CRT, LED screen, hand-held device, keyboard, mouse, voice recognition system, speech output system, printer, monitor, facsimile, pager, etc. Bus 18 provides a communication link between each of the components in computer system 12 and likewise may comprise any known type of transmission link, including electrical, optical, wireless, etc. In addition, although not shown, additional components, such as cache memory, communication systems, system software, etc., may be incorporated into computer system 12.

Database 24 provides storage for information under the present invention. Such information could include, for example, a history of electronic communications (e.g., old e-mail messages), groups 42 of contacts 44, keywords, etc. As such, database 24 may include one or more storage devices, such as a magnetic disk drive or an optical disk drive. In another embodiment, database 24 includes data distributed across, for example, a local area network (LAN), wide area network (WAN) or a storage area network (SAN) (not shown). Database 24 may also be configured in such a way that one of ordinary skill in the art may interpret it to include more than one database.

In general, computer system 12 is used by sender 38, intended recipient(s) 46 and contacts 44 (collectively referred to as the "parties") to send and receive electronic messages. To this extent, it should be appreciated that although not shown, each such party would operate a computerized device capable of generating, sending and/or receiving electronic communications. Such devices could be, for example, personal computers, workstations, personal digital assistants, cellular telephones, etc. Although not shown for brevity purposes, the computerized devices used by the parties would typically include computerized components (e.g., CPU, memory, etc.) similar to computer system 12. In any event, communication with computer system 12 can occur via a direct hardwired connection (e.g., serial port), or via an addressable connection in a client-server (or server-server) environment which may utilize any combination of wireline and/or wireless transmission methods. In the case of the latter, the server and client may be connected via the Internet, a wide area network (WAN), a local area network (LAN), a virtual private network (VPN) or other private network. The server and client may utilize conventional network connectivity, such as Token Ring, Ethernet, WiFi or other conventional communications standards. Where the client communicates with the server via the Internet, connectivity could be provided by conventional TCP/IP sockets-based protocol. In this instance, the client would utilize an Internet service provider to establish connectivity to the server.

Loaded in memory 16 of computer system 12 is communication system 26. Under the present invention, communication system 26 can be part of any electronic communication program (not shown) now known or later developed (e.g., LOTUS NOTES). Alternatively, communication system 26 could exist separately from, and work in conjunction with, such a program. In any event, as depicted, communication system 26 includes grouping system 28, reference system 30, selection system 32, information system 34 and transmission system 36.

Under the present invention, grouping system 28 will implicitly/automatically form one or more groups 42 of contacts 44 based on a history of electronic communications that involve contacts 44. Specifically, grouping system 28 will examine previous electronic communications in which some or all of contacts 44 were named a party (e.g., a sender or recipient) for any patterns/trends that would rationalize forming one or more groups 42 therefrom. If an identified pattern meets some predefined standard, one or more groups 42 could be automatically formed. For example, assume that fifteen previous electronic communications had circulated in which "Joe Smith," "Dave Brown," "Jen Smith" and "Joe Douglas" were named either as a sender or a recipient. Grouping system 28 could form a contact group of these individuals if the pattern (e.g., fifteen electronic communications) meets a predefined standard (e.g., as stored in database 24). For example, if the predefined standard stated that a minimum of ten electronic communications must circulate between certain contacts 44 in order for those contacts 44 to be considered a group, the above-named individuals would meet the threshold and a group would be formed. Alternatively, if the predefined threshold mandated a minimum of twenty electronic communications before a group could be formed, those individuals would not be grouped.

To this extent, the formation of groups 42 could be biased based on keywords contained within the history of electronic communications. Specifically, grouping system 28 could parse the content of the electronic communications to identify the subject matter thereof. Then, based on the content, certain groups 42 could be formed. For example, if all communications involving "Joe Smith" and "Dave Brown" included keywords such as "financials," revenue" and "receivables," those two contacts could be grouped into their own "financial" group.

In any event, it should be understood that any predefined standard could be applied in forming groups 42. For example, the predefined standard could dictate that a particular contact must be involved in a minimum percentage (e.g., 10%) of communications between a set of other contacts before that contact can be included with the group. Thus, if "Joe Smith" sent 1000 electronic communications to "Jen Smith," and "Joe Douglas" was named (e.g. CC'd) in only 5 of those communications, "Joe Douglas" could be excluded when the group is formed (i.e., because 5 out of 1000 is less than 10%). In another embodiment, the predefined standard could apply some type of temporal proximity requirement. For example the predefined standard could require that a certain quantity (e.g., fifteen) or percentage of electronic communications pass within a certain amount of time (e.g., one month) in order for the pattern to result in a group being formed. Thus, if "Joe Smith," "Dave Brown," "Jen Smith" and "Joe Douglas" were named either as a party in fifteen electronic communications over a five year span, the predefined standard could prevent formation of a group.

In any event, after grouping system 28 forms one or more groups 42 from contacts 44 (e.g., and stored the same in database 24), groups 42 can be implicitly/automatically updated according to any predefined updating standard. Similar to the predefined standards applied in form groups 42 to begin with, any type of standard (e.g., quantity, percentage, temporal proximity, etc.) could be applied when updating groups 42. For example, if after being formed, the contacts within group "A" fail to communicate electronically for more than one month, group "A" could be "dissolved." Similarly, if certain contacts stop being involved in the electronic communications, those contacts could be individually dropped from the group. Thus, if an individual gets transferred, retires, etc., that individual need not keep receiving group-based mail. As can be seen, the forming and/or updating of groups under the present invention is an implicit/automatic process that requires no deliberate activity on the part of sender 38, intended recipients or contacts 44. By forming and maintaining groups 42 of contacts in this manner, sender 38 has easy access to lists of appropriate recipients for electronic communications.

Figure 2:
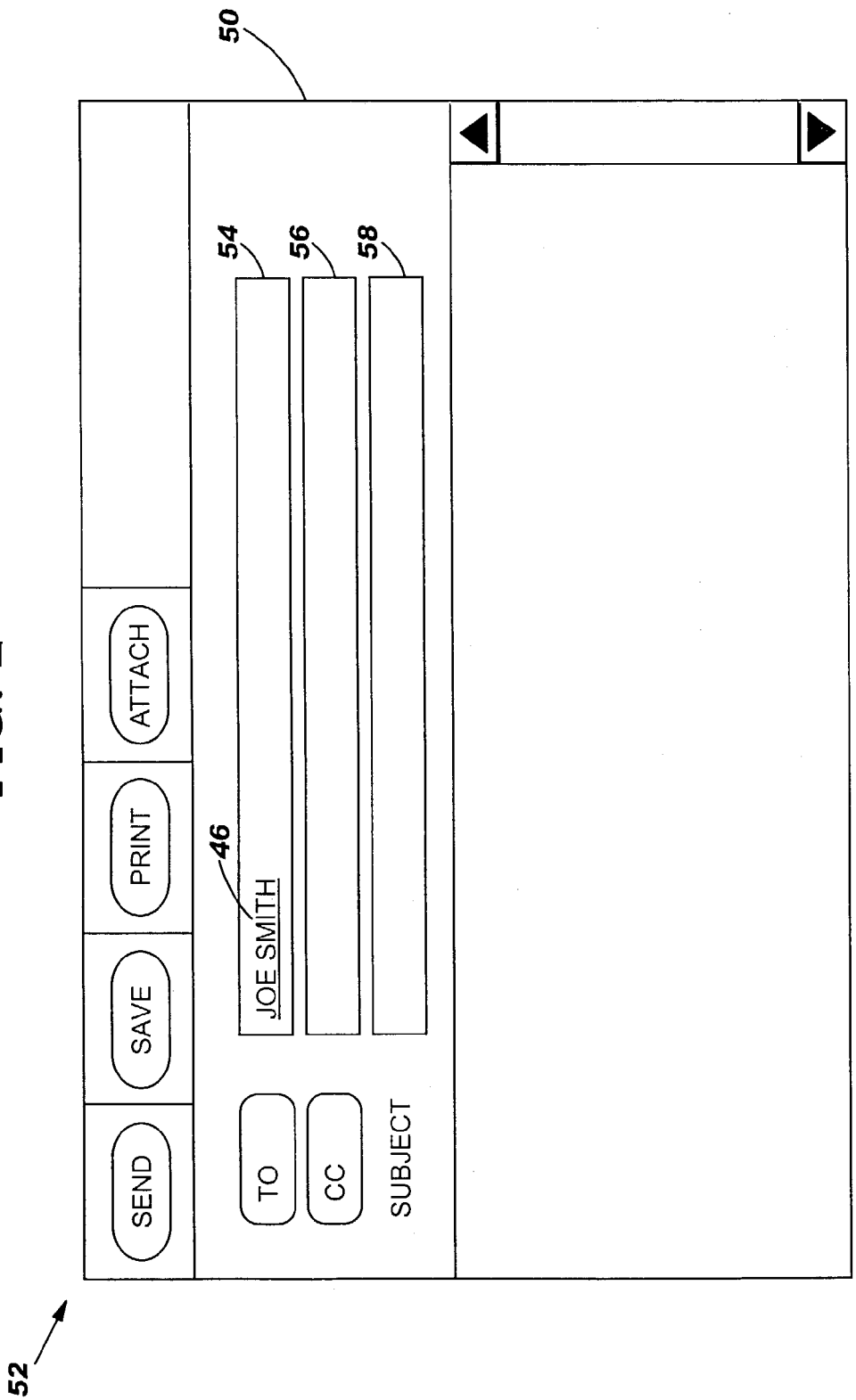
FIG. 2 depicts an illustrative current electronic communication, according to the present invention.

In a typical embodiment, groups 42 can be utilized when sender 38 composes a current electronic communication. Referring to FIG. 2, an illustrative current electronic communication 50 is shown. As can be seen current electronic communication 50 resembles an electronic mail message (although this need not be the case). To this extent, current electronic communication 50 typically includes function buttons 52, recipient field 54, CC field 56 and subject field 58. Sender 38 will identify a set of (e.g., one or more) intended recipients 46 in recipient field 54 and/or CC field 56. Under the present invention, when the set of intended recipients 46 are identified, reference system 30 (FIG. 1) will identify and display one or more groups 42 of contacts 44 for sender 38.

In general, groups 42 of contacts 44 are identified and displayed based on sender 38 and/or the identified set of intended recipients 46. Specifically, the names of sender 38 and/or the set of intended recipients 46 are compared to the names of contacts 44 within groups 42 (e.g., as stored in database 24). When a match is established, the corresponding group is identified and displayed. Thus, for example, if one or more contacts 44 in group "A" are listed as the intended recipient(s) of current electronic communication 50, group "A" will be identified and displayed for sender. To this extent, it should be understood that groups 42 can be displayed to sender 38 using any possible technique. For example, groups 42 in which sender 38 and/or set intended recipients 46 belong could be displayed automatically. Alternatively, groups 42 could be displayed only upon selection of a button or the like by sender 38. In the case of the latter, the button could be inactive or hidden until the system recognizes that sender 38 and/or an intended recipient is part of a group.

It should also be understood that although groups 42 can be identified with any quantity of intended recipients and/or with or without using the identification of sender 38, identifying sender 38 and/or more than one intended recipient can reduce the total number of possible matching groups that will be displayed. For example, reference system 30 can identify and display only those groups that list sender 38 and all identified recipients 46.

Figure 3:
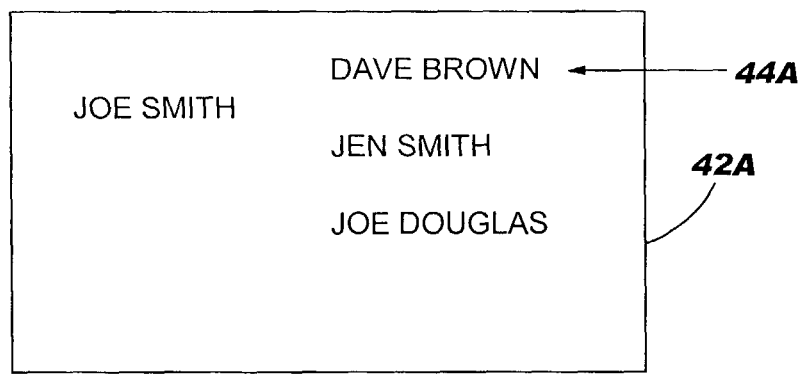
FIG. 3 depicts contact groups identified based on an intended recipient of the current electronic message of FIG. 2.
Figure 3:
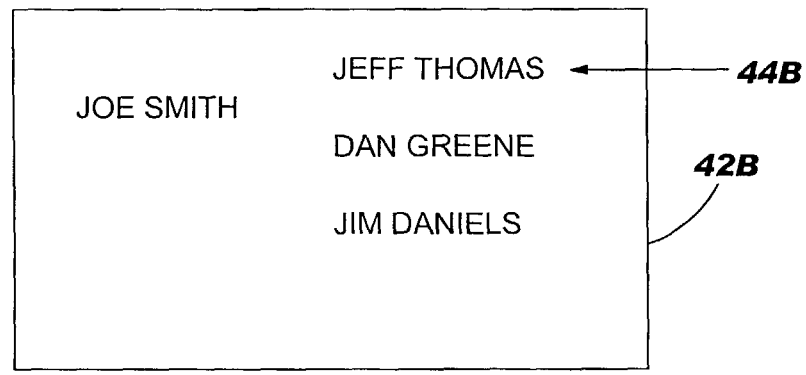
Figure 3:
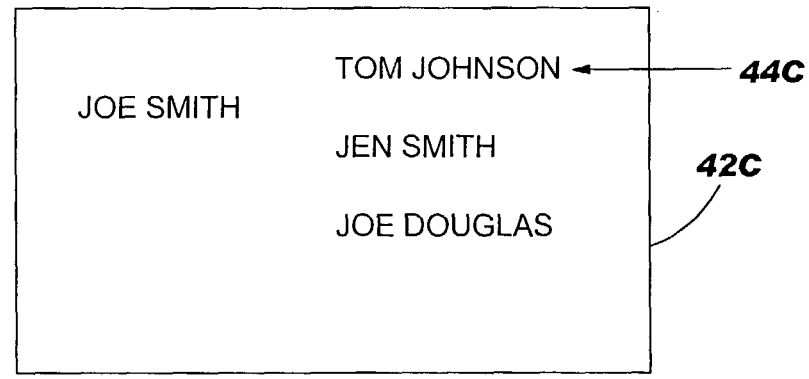

In any event, for the intended recipient shown in FIG. 2 (i.e., Joe Smith), FIG. 3 shows illustrative groups 42A-C of contacts 44A-C that have been identified and displayed. As can be seen, Joe Smith is part of three groups A-C. Using selection system 32 (FIG. 1), sender 38 can then select one or more displayed groups 42A-C. Upon selection of a particular group (e.g., 42A), the contacts therein (e.g., 44A) will be made additional recipients of current electronic communication 50. That is, contacts 44A will be added to the set of identified recipients 46 that previously included only Joe Smith.

Figure 4:
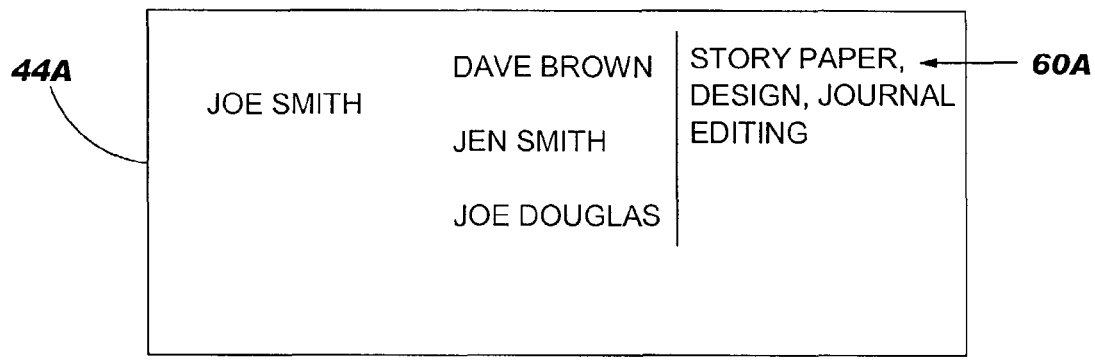
FIG. 4 depicts keyword information pertaining to the contact groups of FIG. 3.
Figure 4:
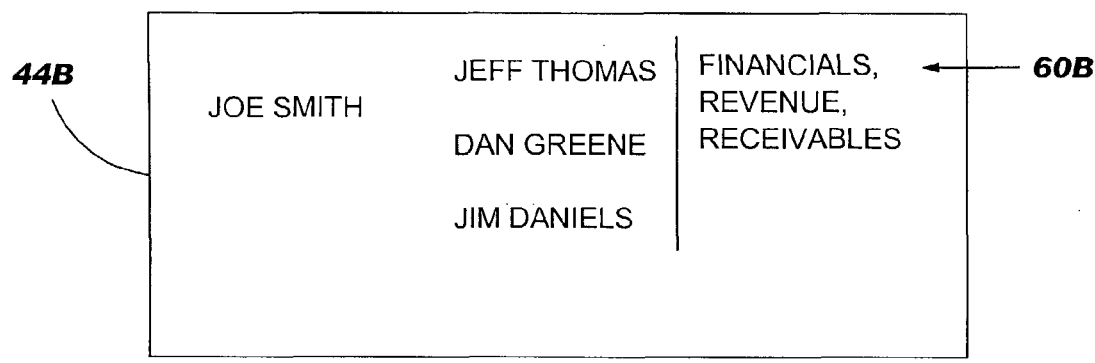
Figure 4:
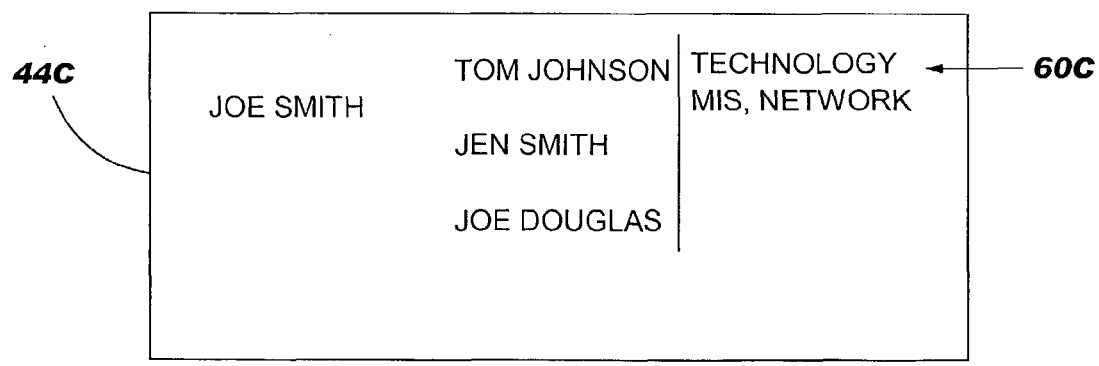

In the event sender 38 wishes to have further information about one or more displayed groups 42A-C before making a selection, information system 34 (FIG. 1) can display keywords. Specifically, as indicated above, when forming groups 42A-C, grouping system 28 could have parsed the history of electronic communications between contacts 44A-C to identify certain keywords. This information could help sender 38 select an appropriate group 42A-C to add to the set of identified recipients 46. Accordingly, when prompted by sender 38, information system 34 could display the corresponding keywords for each group 42A-C. Referring now to FIG. 4, such keywords 60A-C are shown. As depicted, each group 42A-C can actually exist for very different purposes. This can be true even for groups 42A and 42C that have more than one contact in common. By reviewing the displayed keywords 60A-C, sender 38 can select the most appropriate group for additional to set of intended recipients 46.

Once any desired groups 42A-C have been added to set of identified recipients 46, transmission system 36 (FIG. 1) can then transmit current electronic communication 50 thereto. It should be understood, however, that prior to transmitting current electronic communication, sender 38 could delete one or more recipients from set of identified recipients 46. As indicated above, communication system 26 can be part of, or work in conjunction with, any type of electronic communication program. Accordingly, it should be understood that transmission system 36 need not be a part of communication system 26 and is shown as such for illustrative purposes only.

It should also be understood that the present invention can be realized in hardware, software, or a combination of hardware and software. Any kind of computer/server system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

What is claimed:

1. A method for transmitting an electronic communication from a sender to a plurality of contacts using automatically formed contact groups, comprising:
    first, identifying using a processor a set of recipients to which the sender will send a current electronic communication;
    second, using the processor, identifying based on the identified set of recipients, a group of contacts to which the sender has sent communications, the group of contacts including at least one recipient of the identified set of recipients,
        wherein the group of contacts is automatically formed and updated based on a predefined standard and a history of electronic communications that involve the contacts and the at least one recipient of the current electronic communication,
        such that the group of contacts is automatically formed if the history of electronic communications meets the predefined standard,
        wherein the history of electronic communications is stored in a database;
    selecting the group to add the contacts to the set of recipients of the current electronic communication; and
    after adding the contacts to the set of recipients, transmitting the current electronic communication to the set of recipients.

2. The method of claim 1, further comprising providing information pertaining to the group of contacts, prior to the selecting step.

3. The method of claim 1, wherein the predefined standard is based on a keyword included in the contents of the electronic communications that involve the contacts.

4. The method of claim 1, wherein the group of contacts is formed by:
    examining the history of electronic communications that involve the contacts for a pattern that defines the group of contacts;
    forming the group of contacts if the pattern meets the predefined standard.

5. The method of claim 4, wherein the predefined standard is based on a quantity of the electronic communications that involve the contacts.

6. The method of claim 4, wherein the predefined standard is based on a percentage of electronic communications that involve the contacts.

7. The method of claim 4, wherein the predefined standard is based on a temporal proximity of electronic communications that involve the contacts.

8. A method for automatically forming a group of contacts based on a history of electronic communications that involve the contacts, comprising:
    firstly identifying using a processor a set of recipients for a current electronic communication;
    secondly examining using the processor the history of electronic communications between the contacts including at least one recipient of the identified set of recipients for a pattern that defines the contacts, wherein the history of electronic communications is stored in a database;
    thirdly automatically forming and updating the group of contacts if the pattern, based on the examination of the history of electronic communications, meets a predefined standard; and
    after adding the group of contacts to the set of recipients for the current electronic communication, transmitting the current electronic communication to the set of recipients.

9. The method of claim 8, wherein the predefined standard is based on a keyword included in the contents of the electronic communications that involve the contacts.

10. The method of claim 8, wherein the predefined standard is based on one of a quantity of electronic communications that involve the contacts and a percentage of electronic communications that involve the contacts.

11. The method of claim 8, wherein the predefined standard is based on a temporal proximity of electronic communications that involve the contacts.

12. A system for transmitting an electronic communication from a sender to a plurality of contacts using automatically formed contact groups, comprising:
    a system for receiving an identified set of recipients of the current electronic communication;
    a grouping system stored in a memory for automatically forming and updating a group of contacts to which the sender has sent communications,
        the automatic forming and updating being based on a predefined standard and a history of electronic communications that involve the contacts and at least one recipient of the identified set of recipients of the current electronic communication,
        such that the group of contacts is automatically formed if the history of electronic communications meets the predefined standard,
        wherein the history of electronic communications is stored in a database;
    a reference system stored in the memory for identifying the group when one of the plurality of contacts in the group of contacts is identified as an intended recipient of a current electronic communication;
    a selection system stored in the memory for selecting the group, wherein upon selection of the group, the plurality of contacts in the group of contacts are made additional recipients of the current electronic message and
    a transmission system stored in the memory for transmitting the current electronic communication to the intended recipient and the additional recipients.

13. The system of claim 12, further comprising an information system for providing information pertaining to the group of contacts.

14. The system of claim 12, wherein the predefined standard is based on a keyword included in the contents of the electronic communications that involve the contacts.

15. The system of claim 12, wherein the grouping system examines the history of electronic communications that involve the contacts for a pattern that defines the group of contacts, and forms the group of contacts if the pattern meets the predefined standard.

16. The system of claim 15, wherein the predefined standard is based on a quantity of electronic communications that involve the contacts.

17. The system of claim 15, wherein the predefined standard is based on a percentage of electronic communications that involve the contacts.

18. The system of claim 15, wherein the predefined standard is based on a temporal proximity of electronic communications that involve the contacts.

19. A program product stored on a recordable storage medium for transmitting an electronic communication from a sender to a plurality of contacts using automatically formed contact groups, which when executed, comprises:
   program code for receiving a identified set of recipients;
   program code for automatically forming and updating a group of contacts to which the sender sends communications, the automatic forming and updating being based on a predefined standard and a history of electronic communications that involve the contacts and at least one recipient of the identified set of recipients of the current electronic communication,
      such that the group of contacts is automatically formed if the history of electronic communications meets the predefined standard,
      wherein the history of electronic communications is stored in a database;
   program code for identifying the group when one of the plurality of contacts in the group is identified as an intended recipient of a current electronic communication;
   program code for selecting the group, wherein upon selection of the group, the plurality of contacts in the group are made additional recipients of the current electronic message; and
   program code for transmitting the current electronic communication to the intended recipient and the additional recipients.

20. The program product of claim 19, further comprising program code for providing information pertaining to the group of contacts.

21. The program product of claim 19, wherein the predefined standard is based on a keyword included in the contents of the electronic communications that involve the contacts.

22. The program product of claim 19, wherein program code for forming examines the history of electronic communications that involve the contacts for a pattern that defines the group of contacts, and forms the group of contacts if the pattern meets a predefined standard.

23. The program product of claim 22, wherein the predefined standard is based on a quantity of electronic communications that involve the contacts.

24. The program product of claim 22, wherein the predefined standard is based on a percentage of electronic communications that involve the contacts.

25. The program product of claim 22, wherein the predefined standard is based on a temporal proximity of electronic communications that involve the contacts.

* * * * *